Figure 1:
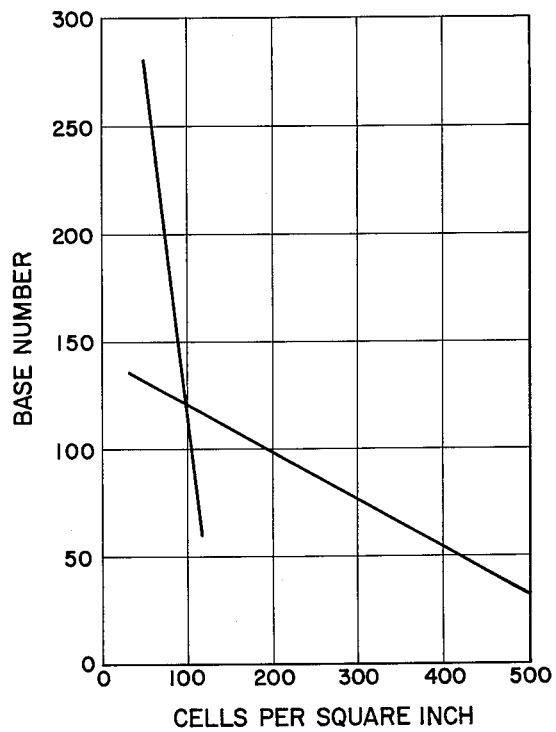

INVENTORS
BILLY W. TERRY
ROY C. SIAS
WARREN W. WOODS
BY
ATTORNEY

Dec. 4, 1962    B. W. TERRY ETAL    3,067,151
PLASTISOL COMPOSITION CONTAINING OVERBASED
OIL-SOLUBLE METAL ORGANIC SULFONATE AND
PROCESS OF FOAMING SAME
Filed Nov. 7, 1960    2 Sheets-Sheet 2

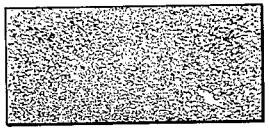

Mg PDB SO$_3$
100% POLYMERIC
0% MONOMERIC

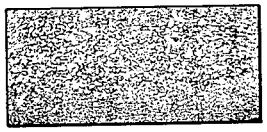

Mg PDB SO$_3$
90% POLYMERIC
10% MONOMERIC

Mg PDB SO$_3$
67% POLYMERIC
33% MONOMERIC

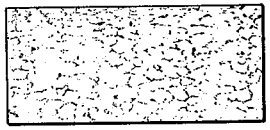

Mg PDB SO$_3$
44% POLYMERIC
56% MONOMERIC

Mg PDB SO$_3$
18% POLYMERIC
82% MONOMERIC

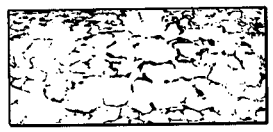

Mg PDB SO$_3$
10% POLYMERIC
90% MONOMERIC

Mg PDB SO$_3$
0% POLYMERIC
100% MONOMERIC

FIG. 3

INVENTORS.
BILLY W. TERRY
ROY C. SIAS
BY   WARREN W. WOODS

Henry H. Huth
ATTORNEY

United States Patent Office 3,067,151
Patented Dec. 4, 1962

3,067,151
PLASTISOL COMPOSITION CONTAINING OVERBASED OIL-SOLUBLE METAL ORGANIC SULFONATE AND PROCESS OF FOAMING SAME
Billy W. Terry, Roy C. Sias and Warren W. Woods, Ponca City, Okla., assignors to Continental Oil Company, Ponca City, Okla., a corporation of Delaware
Filed Nov. 7, 1960, Ser. No. 67,711
27 Claims. (Cl. 260—2.5)

This invention relates to the manufacture of expanded cellular polyvinyl chloride. In one aspect it relates to an improved formulation for use in the preparation of polyvinyl chloride sponge or foam.

The prior art discloses a wide variety of manufacturing techniques and formulations for the production of expanded cellular polyvinyl chloride materials (sometimes called polyvinyl chloride sponge or foam). The expansion of polyvinyl chloride can be accomplished mechanically by the use of inert gas under pressure; or a chemical blowing agent may be used which decomposes upon heating to release a gas. Where the cellular polyvinyl chloride material is intended for use in articles such as shoe inner soles, floats, life preserver or bedding for athletic equipment, expansion of hte polyvinyl chloride is normally carried out at super atmospheric pressure in a closed mold. Cellular materials produced in this fashion are characterized by individual cells and are referred to as "unicellular" or "closed cell" sponge. Cellular materials useful for making toys, padding, cushioning, coat interliners, etc., are usually prepared under atmospheric pressure conditions. They may contain some closed cells but generally have a continuous interconnected cell structure and are called "open cell" sponge.

Formulations employed in the preparation of expanded polyvinyl chloride usually include the resin, various plasticizers, stabilizers, blowing agents, and often other additives including fillers, pigments, etc. In some instances, previous formulations have included as additives plasticizer-soluble (oil-soluble) neutral metal salts of alkyl aryl petroleum sulfonates. These sulfonates are obtained by the treatment of petroleum oils such as refined lubricating oils with fuming sulfuric acid. The oil-soluble petroleum sulfonates are quite complex, fused ring, polycyclic compounds (see "Sulfonation Products of Mineral Oil," Industrial and Engineering Chemistry, May 11, 1948, pages 891–897, Table VII) having an empirical formula $C_nH_{2n-12}SO_3$ (see U.S. Patent 2,357,866, page 1, column 1, lines 26–45).

One of the problems encountered in the prior art in the production of polyvinyl chloride sponge or foam has been the difficulty of obtaining substantially uniform cell structure. The majority of the formulations which have been used previously provide a foam product which contains cells varying widely in size throughout the foam material. In U.S. Patent No. 2,904,522, it is disclosed that formulations using neutral alkaline earth metal alkyl aryl sulfonates provide cellular polyvinyl chloride in which a very fine uniform cell structure is obtained. While such a material finds many uses, it is desirable in many instances to be able to obtain foam polyvinyl chloride in which uniformly large or coarse cells are present.

The invention herein is concerned with an improved additive for use in the manufacture of expanded cellular polyvinyl chloride.

As used herein, the term "blowing agent" is intended to cover broadly both chemical agents and pressurized gases, such as inert gases.

It is an object of this invention to provide improved formulation and process for the preparation of expanded cellular polyvinyl chloride.

It is another object of the invention to provide an improved method and formulation for the preparation of expanded cellular polyvinyl chloride having large uniform cell structure.

Still another object of the invention is to provide improved method and formulation for the preparation of "open cell" expanded polyvinyl chloride having large uniform cell structure.

These and other objects of the invention will become more readily apparent from the following detailed description and discussion.

The foregoing objects are realized broadly by providing for the preparation of expanded cellular polyvinyl chloride, a formulation comprising polyvinyl chloride, plasticizer, blowing agent, and a material consisting essentially of at least one over-based oil-soluble metal organic sulfonate in which the metal is selected from the group consisting of alkali metals and alkaline earth metals.

In one aspect of the invention, the formulation is employed in the preparation of expanded open-cell polyvinyl chloride.

In another aspect of the invention, the formulation is employed in the preparation of expanded unicellular polyvinyl chloride.

Sulfonates which are suitable are oil-soluble and include alkyl sulfonates, alkaryl sulfonates, the so-called mahogany or natural soaps, and the like. The mahogany soaps include, particularly, the oil-soluble aromatic sulfonates from petroleum. Many of the aromatic sulfonates have cycloalkyl (i.e., naphthenic) groups in the side chains attached to the benzene ring. The mahogany soaps may include nonaromatic sulfonates produced in conventional sulfuric acid refining of lubricating oil distillates and from the industrial use of fuming sulfuric acid in the refining of petroleum. The industrial production of oil-soluble mahogany sulfonates from petroleum is well understood in the art and is described in the literature. Normally, the alkyl sulfonates require about 24 carbon atoms for oil solubility. The alkaryl sulfonates, however, require an alkyl portion totaling only about 18 carbon atoms. To attain the requisite oil solubility, therefore, requires that the hydrocarbon portion of the sulfonate have a molecular weight between about 350 and 1,000. Preferably, this molecular weight is between 400 and 700.

Particularly useful sulfonates include diwax benzene and toluene sulfonates and polydodecylbenzene sulfonates. The wax used in making diwax benzene and toluene sulfonates varies and is obtained from different sources of crude petroleum oil. As an example, 126–128° F. melting point wax includes a mixture or organic compounds with a molecular weight averaging between 330–340. The average carbon content of this wax is around 24. As the melting point of the wax decreases, the carbon content of the mixture can average as low as 18 or lower. Mono and polydodecylbenzene sulfonates are obtained from sulfonic acids prepared by sulfonating the product of the alkylation of dodecene with benzene. In this alkylation reaction, a wide range of alkyl benzene compounds is obtained, varying in the alkyl component from as low as 3 to as high as 40 carbon atoms. A particular useful sulfonate is the calcium sulfonate of the residue obtained from the distillation of the alkylation product of dodecene and benzene. This residue which is given the name "postdodecylbenzene" consists of monoalkylbenzenes and dialkylbenzenes in the approximate ratio of 2:3. Its typical physical properties are as follows:

| | |
|---|---|
| Specific gravity at 38° C | 0.8649 |
| Average molecular weight | 385 |
| Percent sulfonatable | 88 |
| A.S.T.M. (.D–158 Engler): | |
| I.B.P °F | 647 |
| 5 °F | 682 |
| 50 °F | 715 |
| 90 °F | 760 |
| 95 °F | 775 |
| F.B.P °F | 779 |
| Refractive index at 23° C | 1.4900 |
| Viscosity at: | |
| −10° C centipoises | 2800 |
| 20° C do | 280 |
| 40° C do | 78 |
| 80° do | 18 |
| Aniline point °C | 69 |
| Pour point °F | −25 |

Other sulfonates which may be used in the process of this invention include, for example, mono and poly-wax substituted naphthalene sulfonates, dinonyl naphthalene sulfonates, diphenyl ether sulfonates, naphthalene disulfide sulfonates, diphenyl amine sulfonates, dicetyl thianthrene sulfonates, dilauryl beta-naphthol sulfonates, dicapryl nitro-naphthalene sulfonates, unsaturated paraffin wax sulfonates, hydroxy substituted paraffin wax sulfonates, tetra-amylene sulfonates, mono- and poly-chlorosubstituted paraffin wax sulfonates, nitrosoparaffin wax sulfonates; cycloaliphatic sulfonates, such as lauryl- cyclo-hexyl sulfonates, mono- and polywax substituted cyclo-hexyl sulfonates, and the like. The expression "petroleum sulfonate" is intended to cover all sulfonates derived from petroleum products.

The preferred sulfonates employed in the formulations of this invention are prepared from alkyl aryl hydrocarbons obtained by the reaction of benzene, toluene, xylene, or naphthalene with an alkylating agent in the presence of a Friedel-Crafts type catalyst, such as boron fluoride, hydrogen fluoride, sulfuric acid, aluminum chloride, etc. The alkylating agent can be a straight or branched chain olefin, organic alcohol or halide, etc. Usually branched chain olefins are preferred as the alkylating agent, such as polymers of propylene, including trimers, tetramers, pentamers, or mixtures thereof. The alkyl aryl hydrocarbon is reacted with a sulfonating agent such as sulfuric acid, oleum, or sulfur trioxide, to convert said hydrocarbon to the corresponding sulfonic acid.

Following the sulfonation, the spent sulfonating agent is removed from the mixture, and the sulfonic acid is converted to the alkali metal or alkaline earth metal sulfonate.

Various methods can be employed for overbasing the metal organic sulfonate. In some of these methods, the sulfonates are used per se. In others, the sulfonic acid is the starting material, said acid being converted to the sulfonate in situ during the overbasing process. Mertes' U.S. Patent No. 2,501,731 describes a process whereby the normal soap is first formed and then an additional base combined therewith by a more-or-less simple mixing and heating operation followed by filtration. Utilizing the basic disclosure of Mertes, Asseff et al. in their U.S. Patent No. 2,616,924 disclose a process whereby a much larger amount of metal or base may be combined with the normal soap, thus forming a complex which may be dispersed in a lubricating oil and, because of the excess metal present, possesses an alkaline reserve. The invention of Asseff et al. differs from the Mertes disclosure in that Asseff et al. employed a so-called promoter. Generally, these promoters are alkylated phenols.

Carlyle's U.S. Patent No. 2,861,951 discloses a process whereby barium carbonate is dispersed in a nonvolatile carrier. By the method disclosed by Carlyle, the inorganic material is dispersed in the nonvolatile carrier in particles that are considerably smaller than 5 microns in diameter.

U.S. Patent No. 2,920,105 to Kluge et al. discloses a process for making oil-soluble hyperbasic alkaline earth metal sulfonates. The process of these patentees comprises forming a reaction mixture of an oil-soluble normal alkaline earth metal sulfonate in a water-immiscible organic medium and an alkaline earth metal lower alkoxy ethanolate in a vehicle of the corresponding alkoxy ethanol, the mole ratio of said alkoxy ethanolate to normal sulfonate being between about 0.5:1 and about 7:1 or even higher, said normal sulfonate starting material containing not substantially more than about the stoichiometric amount of liquid water needed to complete hydrolysis of the alkoxy ethanolate starting material into the corresponding alkaline earth metal hydroxide, stripping the mixture at temperatures of 225° and 450° F., bringing the total quantity of water introduced into the reaction mixture to an amount sufficient for obtaining complete liberation of the combined alkoxy ethanol from the alkoxy ethanolate starting material, and terminating the stripping when substantially all of the alkoxy ethanol, vehicle and hydrolysis reaction product, has been expelled from the reaction mixture.

Application Serial No. 629,229, filed December 19, 1956, now U.S. Patent No. 2,937,991, and having the same assignee as the present invention, discloses a method for preparing a dispersion of calcium carbonate, in particles the diameter of which are less than 0.25 micron, in a nonvolatile carrier. This process uses an aliphatic alcohol solution of an oil-insoluble calcium-containing base formed by the reaction between hydrogen sulfide and either calcium oxide or calcium hydroxide.

Also application Serial No. 653,264, filed April 15, 1957, now U.S. Patent No. 2,956,018, and having the same assignee as the present invention discloses a method for preparing a dispersion of a basic metal containing compound, wherein the cation is Na, Ba, or Ca, in oleaginous compositions. This process uses an oil-insoluble complex formed by passing carbon dioxide through an alcohol-inorganic compound mixture (cation=Na, Ba, or Ca).

Application Serial No. 15,032, filed March 31, 1960, and having the same assignee as the present invention, discloses a method for preparing a dispersion of calcium hydroxide or carbonate in oleaginous compositions. This process uses a calcium lower alkoxy ethanolate which is reacted with a sulfonic acid in the presence of a stoichiometric excess of liquid water.

Application Serial No. 15,031, filed March 31, 1960, and having the same assignee as the present invention, discloses a method for preparing a dispersion of magnesium hydroxide or carbonate in oleaginous compositions. This process uses a magnesium lower alkoxy ethanolate which is reacted with a sulfonic acid in the presence of a stoichiometric excess of liquid water.

It is obvious from the foregoing that a variety of methods have been employed in the art for overbasing sulfonates. As used herein, the term "overbasing" means that the product contains more metal than can be accounted for on the basis of the neutral sulfonate. In the prior art, such terms as "basic," "reserve alkalinity," "complex sulfonate," and "colloidal dispersions" have been employed to denote overbasing. Likewise, many methods have been employed to determine the amount of overbasing in an overbased composition such as, for example, base number, metal content, ash, and sulfated ash. Therefore, an overbased sulfonate broadly can be defined as an organic sulfonate composition which contains more equivalents of metal than the equivalents based on the combining weight of the sulfonic acid.

The preferred overbased sulfonates are those in which the excess equivalents of metal are present in the overbased sulfonate at least in part as finely divided metallic hydroxide or carbonate or mixtures or compositions thereof. These overbased sulfonates are characterized by an increased metal content and normally exhibit an acetic base number (hereinafter described) corresponding approximately to the amount of metal present in excess of that required for the neutral sulfonate.

The overbased metal organic sulfonates employed in the formulations of this invention have base members of at least about 100, preferably above about 120, and more preferably above about 150. The base numbers are determined by the acetic acid titration method which utilizes glacial acetic acid as the solvent and a solution of perchloric acid in glacial acetic acid as the titrant. The method is especially adapted for determinations of this type since equilibria are obtained rapidly. The procedures for carrying out acetic acid titrations are generally outlined in Analytical Chemistry, volume 23, No. 2, February 1951, page 337, and volume 24, No. 3, March 1952, page 519.

When utilizing these compositions, expanded cellular polyvinyl fluoride is obtained in which the cells are uniform and are of a size less than about 200 cells/square inch and preferably less than about 100 cells/square inch. As compared to this, the neutral sulfonates produce expanded cellular products containing more than about 200 cells/square inch and up to more than 1,000 cells/square inch.

As used herein, the "cells/square inch" are determined by cutting a foam sample to expose a representative surface measuring 0.5 x 1.0 inch, counting the number of cells along two connecting sides, multiplying those numbers, and then the product by a factor of two.

As stated previously, the formulation employed in the preparation of expanded cellular polyvinyl chloride include the resin and various additives such as plasticizers, blowing agent, stabilizers, etc. The preferred formulations include as the resin pure polyvinyl chloride; however expanded cellular products can also be made from resins in which the major component is polyvinyl chloride and includes minor amounts of copolymers of vinyl chloride with polymerizable mono-olefinic compounds such as vinyl acetate vinylidene chloride, styrene, etc.

Two types of plasticizing systems can be employed in the formulations. These are monomeric plasticizing systems and polymeric-monomeric plasticizer systems. It has been found that the polymeric plasticizers when used alone do not provide large cell foam products. Among the monomeric plasticizers are materials such as esters of the higher alcohols, including didecyl adipate, diisooctyl adipate, isooctyl palmitate, butyl isodecyl phthalate, octyl decyl phthalate, dioctyl sebacate, and triethyleneglycol dipelargonate. Polymeric plasticizers include usually linear poly esters, epoxy poly esters, polymeric aromatic hydrocarbons, etc. Various combinations and various proportions of polymeric and monomeric plasticizers can be employed in the mixed systems; however, usually the monomeric plasticizer constitutes at least about 40 percent by weight of the mixture and preferably at least about 50 percent by weight.

The stabilizers used in the formulations include metallic oxides, salts and soaps, for example, the metallic soaps of lead, barium, cadmium and calcium, alkyl and aryl phosphates such as dibasic lead phosphate, also organo-metallic complexes, and various organic compounds.

Both inorganic and organic blowing agents can be used. Suitable materials include compounds such as sodium bicarbonate and aluminum carbonate either alone or in combination with organic acids, nitrogen producing compounds such as diazol amino benzene, azol nitriles, etc., also hydrogen derivatives or organo sulfuric acids. The blowing agents also include broadly various inert or other compressed gases employed particularly in the preparation of expanded unicellular product.

In addition to the foregoing, the formulations can contain various additives, fillers such as calcium carbonate, ground cellulose, etc., and various coloring pigments, including carbon black, which can also act as fillers.

The quantities of the various components of the polyvinyl chloride formulations can vary over rather wide ranges, depending on the particular materials employed. Usually the plasticizer system is present in an amount varying from about 60 to about 160 parts per part of resin. The blowing agent is ordinarily employed in lesser amounts, usually not over 30 parts, and preferably from about 5 to about 25 parts per 100 parts of resin. The remaining components, that is, stabilizers, fillers, colorants, etc., usually comprise individually less than 10 parts each per 100 parts of resin. The overbased metal organic sulfonate falls in the latter category and is usually employed in amounts varying from about 1 to about 5 parts per 100 parts of resin. Said sulfonates are preferably diluted with a suitable diluent such as mineral oil, secondary plasticizer, etc., for ease of handling. Generally, it is desirable to utilize sufficient diluent that the quantity of sulfonate does not exceed about 60 percent by volume of the sulfonate diluent mixture and preferably not over about 40 percent.

The formulations employed in the invention can be admixed and prepared according to any of the conventional procedures; likewise the expanded (either open cell or unicellular) polyvinyl chloride product can be manufactured in accordance with the processes conventionally employed in the art. No attempt has been made to describe specific formulations, since these are well known and are readily prepared by those skilled in the art. A variety of specific formulations are described in a technical service bulletin, "Preliminary Bulletin 2A" further entitled "Formulation of Open-Cell PVC Sponge at Atmospheric Pressure," dated September 15, 1955, by E. I. du Pont de Nemours and Company. In addition to setting forth polyvinyl chloride formulations, this bulletin also describes in detail various components which can be employed in the formulations and specific procedures for the preparation of open-cell expanded polyvinyl chloride.

The cellular polyvinyl chloride can be prepared in accordance with the method of this invention in either a batch or continuous process. In a continuous process, control of cell size is important, and this can be effected within the scope of the invention by utilizing as a means of control the degree of overbasing in the sulfonate employed in the formation. Thus, in effect, the cell size can be maintained substantially constant or can be varied to provide a variety of products by appropriately varying the degree of overbasing in the sulfonate.

The following examples are presented in illustration of the invention.

Neutral calcium postdodecylbenzene sulfonate was prepared as follows:

Benzene was reacted with dodecene (propylene tetramer) in the presence of $AlCl_3$ at a temperature of about 45° C. The alkylation product was distilled under vacuum to provide a distillation bottoms fraction (postdodecylbenzene) having the general properties set forth in column 3, lines 8–33. The postdodecylbenzene (PDB) was sulfonated with $SO_3$ in mineral oil, diluted with about 1½ volumes of naphtha per volume of acid and gravity settled for spent acid removal. The diluted sulfonic acid was then treated with Ca(OH)₂ (about 1.5 theories based on the difference between the total acidity and sulfonic acidity expressed as meq./g.), and after filtration, degassed with carbon dioxide for SO₂ removal. The purified sulfonic acid solution (in mineral oil) was charged to a reaction flask and sufficient secondary plasticizer [1] added so that the final product would be theoretically 35 percent active. Next, the reaction mass was neutralized with Ca methyl Cellosolve carbonate. After the neutralization, the volatile materials were taken overhead to a pot temperature of 150° C., whereupon the reaction mass was stripped with carbon dioxide for about 15 minutes to provide neutral Ca sulfonate having the following composition:

| | Weight percent |
|---|---|
| Mineral oil | 28 |
| Calcium postdodecylbenzene sulfonate | 34 |
| Secondary plasticizer [1] | 38 |
| | 100 |

[1] A fraction of the reaction product of dodecene and benzene boiling above postdodecylbenzene and designated as "postdodecylbenzene overhead." This fraction has a boiling range of about 600 to about 690° F., a sp. gr. of 0.860 to 0.870 and a molecular weight of about 300.

Neutral magnesium postdodecylbenzene sulfonate was prepared in a similar manner, with Mg methyl Cellosolve carbonate being employed for neutralization.

Overbased calcium post dodecylbenzene sulfonate was prepared as follows:

Purified sulfonic acid solution (in mineral oil) prepared as set forth above was charged to a reaction flask, followed by sufficient secondary plasticizer (postdodecylbenzene overhead) so that the final product would be theoretically 35 percent active. Next, 1.5 theories of water was charged (50 percent in excess of that required to convert all of the excess Ca methyl Cellosolve carbonate to Ca(OH)₂). The reaction mass was mixed and heated to 45° C.; then, sufficient Ca methyl Cellosolve carbonate was charged over a period of about 10 minutes to neutralize the sulfonic acid solution and provide the desired base number. The volatile materials were then taken overhead to a pot temperature of 150° C., followed by stripping with carbon dioxide for about 15 minutes. The crude product was filtered, yielding a bright, fluid product.

Overbased magnesium postdodecylbenzene sulfonate was prepared as follows:

Purified sulfonic acid solution (in mineral oil) was charged to a reaction flask, followed by sufficient secondary plasticizer (postdodecylbenzene overhead) so that the final product would be theoretically 35 percent active. The reaction mass was heated to 45° C. and then neutralized with Mg methyl Cellosolve carbonate. Next, one fourth of the total amount of water required for the reaction was charged. The total amount of water for the reaction is based on 50 percent in excess of that required to convert the excess Mg methyl Cellosolve carbonate to Mg(OH)₂. After the partial water addition, the remainder of the water and excess (overbasing) Mg methyl Cellosolve carbonate is added concurrently at such a rate that when all of the water has been charged to the reaction mass, 20 percent of the excess Cellosolve carbonate remains to be added. After complete additions for the desired base number, the volatile materials were then taken overhead to a pot temperature of 150° C., followed by stripping with carbon dioxide gas for about 15 minutes. The resulting product was bright and fluid.

A formulation containing neutral calcium postdodecylbenzene sulfonate was prepared as follows:

EXAMPLE 1

| Component: | Parts by weight |
|---|---|
| Geon 121 [1] | 100 |
| Paraplex G-62 [2] | 50 |

[1] Trade name for polyvinyl chloride.
[2] Trade name for epoxy polyester plasticizer.

EXAMPLE 1—Continued

| Component: | Parts by weight |
|---|---|
| Flexol CC-55 [3] | 40 |
| Adipol 10-A [4] | 8 |
| Flexricin 66 [5] | 8 |
| Chlorowax 40 [6] | 8 |
| Calcium oxide | 1 |
| Ti-Pure (R-610) [7] | 2 |
| Stayrite 90 [8] | 2 |
| Neutral Ca postdodecylbenzene sulfonate [9] | 3.6 |
| Blowing agent [9] | 13.3 |

[3] Trade name for di(2-ethyl hexyl) hexahydrophthalate plasticizer.
[4] Trade name for diisooctyl adipate plasticizer.
[5] Trade name for isobutyl acetyl ricinoleate plasticizer.
[6] Trade name for chlorinated paraffin plasticizer.
[7] Trade name for titanium dioxide additive.
[8] Trade name for mixture of fatty-acid soaps stabilizer.
[9] Acetic base number 5, 1.5 percent Ca.
[10] 52.6 percent N,N'-dimethyl-N,N'-dinitrosoterephthalamide +22.6 percent mineral oil +24.8 percent "postdodecylbenzene" secondary plasticizer.

The above plastisol formulation was prepared by mixing the above materials on a planetary-type mixer until it was a smooth, uniform paste. Next 35 grams of the plastisol were poured into an open metal mold and placed in an oven at 212° F. for about 30 minutes for blowing (foam generation). It was then cured for about 14 minutes at 350° F.

Upon visual inspection of a test specimen from the above-prepared foam, it was found that, as anticipated, the foam cells were small and uniform (about 420 cells per square inch).

EXAMPLE 2

The charge and procedure of Example 1 were repeated with the exception that 3.6 parts of neutral Mg sulfonate (34 percent active, 38 percent secondary plasticizer (postdodecylbenzene overhead), 28 percent mineral oil, acetic base number 0, and .8 percent Mg) were employed instead of neutral Ca sulfonate. Results were similar to Example 1 except the cell size was considerably larger (about 120 cells per square inch).

EXAMPLE 3

The charge and procedure of Example 1 were repeated with the exception that 3.6 parts of 128 base number Mg sulfonate (35 percent active, 27 percent mineral oil, 23 percent secondary plasticizer (postdodecylbenzene overhead), and 3.8 percent Mg) were employed instead of neutral Mg sulfonate.

Upon visual inspection of the foam cells, it was found that they were large and uniform (about 50 cells per square inch).

EXAMPLE 4

The charge and procedure of Example 1 were repeated except that 3.6 parts of 143 base number Ca sulfonate (33 percent active, 29 percent mineral oil, 27 percent secondary plasticizer (postdodecylbenzene overhead) and 6.8 percent Ca) were employed instead of neutral Mg sulfonate. Results were similar to Example 3 (about 90 cells per square inch).

EXAMPLE 5

The charge and procedure of Example 1 were repeated except that 3.6 parts of 284 base number Mg sulfonate (35 percent active, 27 percent mineral oil, 13 percent secondary plasticizer (postdodecylbenzene overhead), and 6.9 percent Mg) were employed instead of neutral Mg sulfonate. Results were similar to Example 3 (about 70 cells per square inch).

EXAMPLE 6

The charge and procedure of Example 1 were employed except that 3.6 parts of 282 base number Ca sulfonate (31 percent active, 27 percent mineral oil, 15 percent secondary plasticizer (postdodecylbenzene overhead), and 11.2 percent Ca) were employed instead of neutral Mg sulfonate. Results were similar to Example 3 (about 50 cells per square inch).

EXAMPLE 7

Additional tests were carried out utilizing a monomeric plasticizer system:

| Component: | Parts by weight |
|---|---|
| Geon 121 [1] | 100 |
| Flexol 10–10 [2] | 60 |
| RC–O 16 [3] | 20 |
| Santicizer 160 [4] | 20 |
| Calcium oxide | 1 |
| Duponol ME [5] | 1.6 |
| Advastab BC–105 [6] | 3 |
| Advastab E–49 [7] | 2 |
| Metal postdodecylbenzene sulfonate | 3.6 |
| Blowing agent [8] | 13.3 |

[1] Trade name for polyvinyl chloride.
[2] Trade name for didecyl phthalate plasticizer.
[3] Trade name for isooctyl palmitate plasticizer.
[4] Trade name for butyl benzyl phthalate plasticizer.
[5] Trade name for dry fatty alcohol sodium sulfate additive.
[6] Trade name for liquid barium-cadmium type stabilizer.
[7] Trade name for nonmetallic complex organic stabilizer.
[8] 52.6 percent N,N' - dimethyl - N,N' - dinitrosoterephthalamide + 22.6 percent mineral oil + 24.8 percent "postdodecylbenzene" secondary plasticizer.

The procedures of Examples 1 to 6 were repeated using 35 grams of the above plastisol. The results are presented in Table I:

*Table I*

| Sulfonate | Base number | Foam product, approximate cells/sq. in. |
|---|---|---|
| Ca PDB | 5.4 | 440 |
| Ca PDB | 143 | 170 |
| Ca PDB | 282 | 50 |
| Mg PDB | 0 | 190 |
| Mg PDB | 128 | 155 |
| Mg PDB | 284 | 85 |

It is noted that the overbased sulfonates again produced large cell foamed products and that the cell size increased with increased overbasing.

EXAMPLE 8

Additional foam samples were prepared utilizing a polymeric plasticizer system:

| Component: | Parts by weight |
|---|---|
| Geon 121 resin [1] | 100 |
| Paraplex G–50 [2] | 50 |
| Paraplex G–62 [3] | 50 |
| Advastab BC–105 [4] | 2 |
| Metal postdodecylbenzene sulfonate | 3.7 |
| Blowing agent [5] | 12.4 |

[1] Trade name for polyvinyl chloride.
[2] Trade name for polymeric polyester plasticizer.
[3] Trade name for epoxy polyester plasticizer.
[4] Trade name for liquid barium-cadmium type stabilizer.
[5] 52.6 percent N,N' - dimethyl - N,N' - dinitrosoterephthalamide + 22.6 percent mineral oil + 24.8 percent "postdodecylbenzene" secondary plasticizer.

The procedures of Examples 1–6 were repeated using 35 grams of the above plastisol. The results are presented in Table II.

*Table II*

| Sulfonate | Base number | Foam product, approximate cells/sq. in. |
|---|---|---|
| Ca PDB | 5.4 | 640 |
| Ca PDB | 143 | 1,050 |
| Ca PDB | 282 | 1,025 |
| Mg PDB | 0 | 130 |
| Mg PDB | 128 | 630 |
| Mg PDB | 284 | 600 |

The products obtained with the polymeric plasticizer system were almost all uniformly small cell, both with neutral and overbased sulfonates.

EXAMPLE 9

Additional foam products were prepared using the formulation of Example 1 and Ca PDB sulfonates having base numbers 27, 66, and 96, respectively, with the following results:

*Table III*

| Sulfonate | Base number | Foam product, approximate cells/sq. in. |
|---|---|---|
| Ca PDB | 27 | 480 |
| Ca PDB | 66 | 390 |
| Ca PDB | 96 | 240 |

The results of these runs and the runs of Examples 1, 4, and 6 were plotted in FIGURE 1. It is noted from FIGURE 1 that there is a definite change in slope of the cell size curve between base numbers of 100 and 150.

EXAMPLE 10

Neutral and overbased calcium Petronate [1] were tested in the polymeric-monomeric plasticizer system of Example 1. The neutral material gave a product having a cell count of 400–600. Overbased Petronate (148 base number) provided a foam product having about 110 cells/square inch.

[1] Neutral calcium petronate is a trade name for neutral calcium sulfonate. This sulfonate is prepared by the reaction between sulfuric acid and petroleum distillate. The sulfonate is oil soluble and has a generic formula $(C_nH_{(2n-10)}SO_3)_2Ca$, where $n$ is over 20. Properties of the sulfonate are as follows:

PROPERTIES

| Composition: | Percent |
|---|---|
| Calcium sulfonate complex | 41.0 |
| Mineral oil | 58.5 |
| Water | 0.5 |
| | 100.0 |

Percent calcium in sulfonate complex____percent__ 2.86
Base number_____ 0
Solubility in oil_____ Clear
Molecular weight_____ 888
Weight per gallon_____pounds__ 8.2

Further details concerning the sulfonate are given in a pamphlet WO 1872 published by L. Sonneborn Sons, Inc., in May 1956.

EXAMPLE 11

Barium PDB sulfonate (base number 70) was tested in the polymeric-monomeric system of Example 1 and provided a product having about 220 cells/square inch. This compares very favorably with Ca PDB sulfonate (base number 66) of Example 9.

EXAMPLE 12

Tests were carried out using the polymeric-monomeric system of Example 1 in which Ca and Mg carbonates were added to the plastisols as separate ingredients. Neutral Ca and Mg PDB sulfonates were used in these tests.

The results of the tests are presented in Table IV:

Table IV

| Neutral sulfonates | Parts/100 parts of plastisol | | Foam product approximate cells/sq. in. |
|---|---|---|---|
| | CaCO₃ | MgCO₃ | |
| Ca PDB | 0.0 | | 640 |
| Ca PDB | 0.5 | | 750 |
| Ca PDB | 1.0 | | 390 |
| Ca PDB | 4.0 | | 460 |
| Mg PDB | | 0.0 | 130 |
| Mg PDB | | 0.5 | 255 |
| Mg PDB | | 1.0 | 865 |
| Mg PDB | | 4.0 | 185 |

A 300 base number sulfonate provides less than 0.5 part of carbonate/100 parts of plastisol. It is apparent from the table (compare with Examples 5 and 6) that the neutral Ca and Mg sulfonates when admixed with Ca and Mg carbonate do not give the same results as overbased sulfonates.

EXAMPLE 13

Additional foam products were prepared to determine the effect of various proportions of polymeric and monomeric plasticizers. The compositions of these formulations are set forth in Table V:

Table V

| Ingredients | 100% poly | 90% poly 10% mono | 67% poly 33% mono | 44% poly 56% mono | 18% poly 82% mono | 10% poly 90% mono | 100% mono |
|---|---|---|---|---|---|---|---|
| Geon 121 [1] | 100 | 100 | 100 | 100 | 100 | 100 | 100 |
| Paraplex G-62 [2] | 115 | 103 | 78 | 50 | 21 | 12 | |
| Flexol CC-55 [3] | | 9 | 20 | 40 | 60 | 82 | 92 |
| Adipol 10-A [4] | | 1 | 6 | 8 | 11 | 7 | 8 |
| Flexricin P-6 [5] | | 1 | 6 | 8 | 11 | 7 | 8 |
| Chlorowax 40 [6] | | 1 | 6 | 8 | 11 | 7 | 8 |
| Calcium oxide | 2 | 2 | 2 | 1 | 2 | 2 | 2 |
| Stayrite 90 [7] | 2 | 2 | 2 | 2 | 2 | 2 | 2 |

[1] Trade name for polyvinyl chloride.
[2] Trade name for epoxy polyester plasticizer.
[3] Trade name for di(2-ethyl hexyl) hexahydrophthalate plasticizer.
[4] Trade name for diisooctyl adipate plasticizer.
[5] Trade name for isobutyl acetyl ricinoleate plasticizer.
[6] Trade name for chlorinated paraffin plasticizer.
[7] Trade name for mixture of fatty-acid soaps stabilizer.

Plastisols were then formulated as follows:

Ingredients: Parts
    Plastisol _____ 92.9
    Sulfonate _____ 1.5
    Blowing agent [1] _____ 5.6

[1] 52.6 percent N,N'-dimethyl-N,N'-dinitrosoterephthalamide +22.6 percent mineral oil +24.8 percent "postdodecylbenzene" secondary plasticizer.

The sulfonates employed in the test were neutral calcium postdodecylbenzene sulfonate, overbased calcium postdodecylbenzene sulfonate (base No. 282), and overbased magnesium postdodecylbenzene sulfonate (base No. 284).

The plastisol formulations were foamed in accordance with the procedure of Example 1 with the results set forth in Table VI:

Table VI

EFFECT OF POLYMERIC-MONOMERIC PLASTICIZER BLENDS ON CELL COUNT WHEN USING OVERBASED SULFONATES

| Ratio monomeric to polymeric plasticizers | Cell count per square inch | | | Cell count, overbased sulfonate/cell count, neutral sulfonate × 100 | |
|---|---|---|---|---|---|
| | Neutral Ca PDB sulfonate | Overbased Ca PDB sulfonate | Overbased Mg PDB sulfonate | Overbased Ca PDB sulfonate | Overbased Mg PDB sulfonate |
| 100 polymeric, 0 monomeric | 700 | 616 | 644 | 88 | 92 |
| 90 polymeric, 10 monomeric | 1,330 | 598 | 728 | 45 | 55 |
| 67 polymeric, 33 monomeric | 840 | 480 | 234 | 57 | 28 |
| 44 polymeric, 56 monomeric [1] | 552 | 52 | 70 | 9 | 13 |
| 18 polymeric, 82 monomeric | 252 | 154 | 84 | 61 | 33 |
| 10 polymeric, 90 monomeric | 560 | 160 | 90 | 29 | 17 |
| 0 polymeric, 100 monomeric | 392 | 126 | 140 | 32 | 36 |

[1] Data obtained from Examples 5 and 6.

Figure 2:
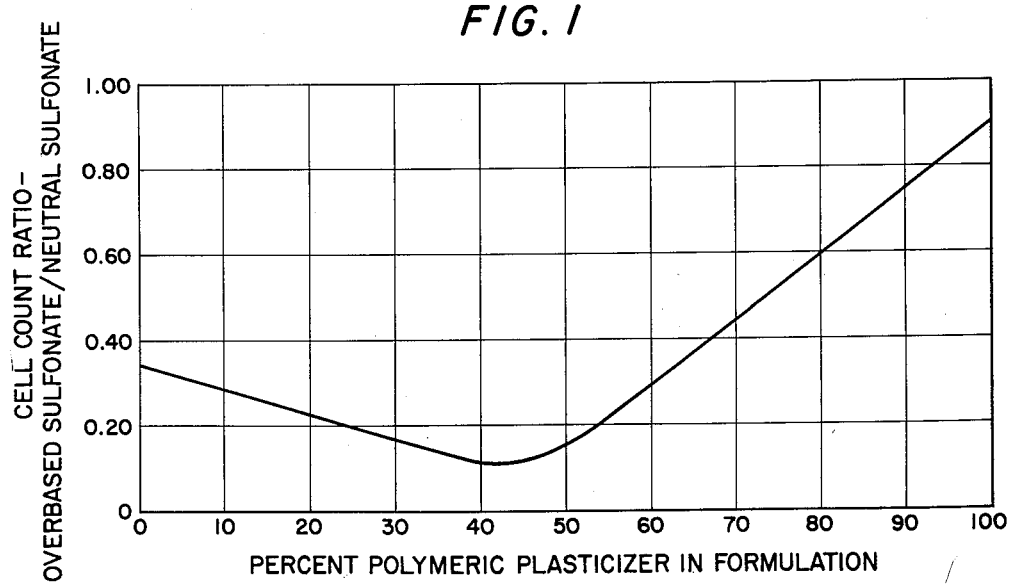

The data of Table VI are presented in graphical form in FIGURE 2 wherein the percent polymeric plasticizer in each formulation is plotted against the cell count ratio of the overbase sulfonate to the neutral sulfonate. Referring to FIGURE 2, it is noted that, as the percent polymeric plasticizer in the formulation decreases from 100, the cell count ratio also decreases, with a minimum being reached at about 45 percent polymeric plasticizer. The cell count ratio then shows a slight upward trend, with further decrease in the percent polymeric plasticizer.

Representative examples of foams obtained with the overbased magnesium postdodecylbenzene sulfonate of this example are shown in FIGURE 3.

Having thus described the invention by providing specific examples thereof, it is to be understood that no undue limitations or restrictions are to be drawn by reason thereof and that many variations and modifications are within the scope of the invention.

We claim:

1. In a process for the preparation of expanded cellular polyvinyl chloride from a formulation comprising polyvinyl chloride, plasticizer selected from the group consisting of monomeric and polymeric-monomeric and blowing agent, the improvement which comprises incorporating in said formulation prior to the formation of the cellular polyvinyl chloride at least one overbased oil-soluble metal organic sulfonate having a base number of at least 100 as determined by the acetic acid titration method in which the metal is selected from the group consisting of alkali metals and alkaline earth metals.

2. The process of claim 1 in which said sulfonate has a base number of at least about 125.

3. The process of claim 2 in which the organic component of said sulfonate is alkyl aryl and has a molecular weight between about 300 and about 1,000.

4. The process of claim 3 in which said sulfonate is calcium postdodecylbenzene sulfonate.

5. The process of claim 3 in which said sulfonate is magnesium postdodecylbenzene sulfonate.

6. The process of claim 3 in which said sulfonate is barium postdodecylbenzene sulfonate.

7. The process of claim 4 in which said sulfonate is diluted prior to incorporation in said formulation.

8. The process of claim 5 in which said sulfonate is diluted prior to incorporation in said formulation.

9. The process of claim 6 in which said sulfonate is diluted with mineral oil and a secondary plasticizer prior to incorporation in said formulation.

10. In a process for the preparation of an expanded open-cell polyvinyl chloride from a formulation comprising polyvinyl chloride, plasticizer selected from the group consisting of monomeric and polymeric-monomeric and blowing agent, the improvement which comprises incorporating in said formulation prior to the formation of the expanded unicellular polyvinyl chloride at least one overbased oil-soluble alkaline earth metal alkyl aryl sulfonate in which the aryl component is selected from the group consisting of benzene, toluene, xylene, and naphthalene, said sulfonate having a base number of at least 125 as determined by the acetic acid titration method.

11. The process of claim 10 in which said sulfonate is magnesium postdodecylbenzene sulfonate.

12. The process of claim 10 in which said sulfonate is calcium postdodecylbenzene sulfonate.

13. The process of claim 10 in which said sulfonate is barium postdodecylbenzene sulfonate.

14. The process of claim 11 in which the said sulfonate is incorporated in the formulation in an amount between about 1 and about 5 parts per 100 parts of polyvinyl chloride.

15. The process of claim 12 in which the said sulfonate is incorporated in the formulation in an amount between about 1 and about 5 parts per 100 parts of polyvinyl chloride.

16. The process of claim 13 in which the said sulfonate is incorporated in the formulation in an amount between about 1 and about 5 parts per 100 parts of polyvinyl chloride.

17. A plastisol composition for use in the preparation of expanded cellular polyvinyl chloride which comprises polyvinyl chloride, plasticizer selected from the group consisting of monomeric and polymeric-monomeric, blowing agent and at least one overbased metal organic sulfonate having a base number of at least 100 as determined by the acetic acid titration method in which the metal is selected from the group of alkali metals and alkaline earth metals.

18. The composition of claim 17 in which said sulfonate has a base number of at least about 125.

19. The process of claim 18 in which the organic component of said sulfonate is alkyl aryl and has a molecular weight between about 300 and about 1,000.

20. A plastisol composition for use in the preparation of expanded open-cell polyvinyl chloride which comprises polyvinyl chloride, plasticizer selected from the group consisting of monomeric and polymeric-monomeric, blowing agent, and at least one overbased oil-soluble alkaline metal alkyl aryl sulfonate in which the aryl component is selected from the group consisting of benzene, toluene, xylene, and naphthalene, said sulfonate having a base number of at least 125 as determined by the acetic acid titration method.

21. A plastisol composition for use in the preparation of expanded open-cell polyvinyl chloride comprising polyvinyl chloride, plasticizer selected from the group consisting of monomeric and polymeric-monomeric, blowing agent and between about 1 and about 5 parts per 100 parts of polyvinyl chloride of overbased calcium postdodecylbenzene sulfonate, said sulfonate having a base number of at least 125 as determined by the acetic acid titration method.

22. A plastisol composition for use in the preparation of expanded open-cell polyvinyl chloride comprising polyvinyl chloride, plasticizer selected from the group consisting of monomeric and polymeric-monomeric, blowing agent and between about 1 and about 5 parts per 100 parts of polyvinyl chloride of overbased magnesium postdodecylbenzene sulfonate, said sulfonate having a base number of at least 125 as determined by the acetic acid titration method.

23. In a process for the preparation of expanded open-cell polyvinyl chloride from a formulation comprising polyvinyl chloride, plasticizer selected from the group consisting of monomeric and polymeric-monomeric and blowing agent, the improvement which comprises incorporating in said formulation prior to the formation of the cellular polyvinyl chloride at least one overbased oil-soluble metal organic sulfonate in which the metal is selected from the group consisting of alkali metals and alkaline earth metals and varying the cell size of said expanded polyvinyl chloride by varying the amount of overbasing in said sulfonate, said amount of overbasing corresponding to a base number of at least 100 as determined by the acetic acid titration method.

24. The process of claim 23 in which the organic component of said sulfonate is alkyl aryl and has a molecular weight between about 300 and about 1,000.

25. The process of claim 24 in which said sulfonate is calcium postdodecylbenzene sulfonate.

26. The process of claim 24 in which said sulfonate is magnesium postdodecylbenzene sulfonate.

27. The process of claim 24 in which said sulfonate is diluted with mineral oil and a secondary plasticizer prior to incorporation in said formulation.

References Cited in the file of this patent

UNITED STATES PATENTS 2,904,522    Cottin et al. _____ Sept. 15, 1959